United States Patent
Prasad

(10) Patent No.: US 11,316,906 B1
(45) Date of Patent: Apr. 26, 2022

(54) OPERATIONAL MONITORING OF NETWORK DEVICES

(71) Applicant: United Services Automobile Association (USAA), San Antonio, TX (US)

(72) Inventor: Bharat Prasad, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 50 days.

(21) Appl. No.: 16/896,817

(22) Filed: Jun. 9, 2020

Related U.S. Application Data

(63) Continuation of application No. 15/838,554, filed on Dec. 12, 2017, now Pat. No. 10,721,274.

(60) Provisional application No. 62/433,097, filed on Dec. 12, 2016.

(51) Int. Cl.
| | |
|---|---|
| *H04L 29/06* | (2006.01) |
| *H04L 9/32* | (2006.01) |
| *H04L 43/0817* | (2022.01) |
| *H04L 9/06* | (2006.01) |
| *H04L 41/0893* | (2022.01) |

(52) U.S. Cl.
CPC ............ *H04L 63/20* (2013.01); *H04L 9/0637* (2013.01); *H04L 9/3247* (2013.01); *H04L 9/3297* (2013.01); *H04L 41/0893* (2013.01); *H04L 43/0817* (2013.01)

(58) Field of Classification Search
CPC ..... H04L 63/20; H04L 9/0637; H04L 9/3247; H04L 9/3297; H04L 41/0893; H04L 43/0817; H04W 12/06; H04W 4/28
See application file for complete search history.

(56) References Cited

U.S. PATENT DOCUMENTS

| | | | |
|---|---|---|---|
| 9,892,463 B1 * | 2/2018 | Hakimi-Boushehri | G06Q 40/08 |
| 2005/0289049 A1 * | 12/2005 | Schuver | G06Q 40/00 705/40 |
| 2017/0214699 A1 * | 7/2017 | Johnsrud | H04L 9/3239 |

* cited by examiner

*Primary Examiner* — Yogesh Paliwal
(74) *Attorney, Agent, or Firm* — Fish & Richardson P.C.

(57) ABSTRACT

Techniques are described for managing risk in a network that includes one or more Internet-of-Things (IoT) devices. Management module(s) may operate to determine a model for an IoT in a home, office, or other environment, the model describing typical operations of the device(s) that are connected over an IoT. The operations of the IoT devices may be monitored for compliance with the model. The management module(s) may detect instances when one or more IoT devices exhibit behaviors that are a deviation from the normal operations indicated in the model, such as device failures. A policy may operate (e.g., as a smart contract) to transfer value to a user account in response to detecting an operational deviation of IoT device(s).

17 Claims, 5 Drawing Sheets

US 11,316,906 B1

OPERATIONAL MONITORING OF NETWORK DEVICES

CROSS-REFERENCE TO RELATED APPLICATIONS

This application is a continuation application of and claims priority under 35 U.S.C. § 120 to U.S. application Ser. No. 15/838,554, filed on Dec. 12, 2017, which is related to, and claims priority to, U.S. Provisional Patent Application Ser. No. 62/433,097, titled "Network Risk Management," which was filed on Dec. 12, 2016, the entire contents of each of which are incorporated herein by reference.

BACKGROUND

There has been a significant increase in the number of smart appliances, computing devices, smart vehicles, utility devices, smart building components, smart infrastructure management devices, and/or other types of objects that are available for the home or other environments. Such objects may include data collection, computing, sensing, and/or network communications capabilities in addition to their normal functionality. For example, in addition to its typical capabilities for keeping food cold, a smart refrigerator may include processing capacity, storage, and network connectivity to enable remote control of the refrigerator and/or to enable other devices to receive information regarding the status and operations of the refrigerator. These objects may be organized into an Internet of Things (IoT), and the objects themselves may be described as IoT devices. The various devices on an IoT may generate data, such as sensor data, status information, and so forth, and the data may be shared among the devices over one or more wired or wireless networks. An IoT may enable devices to be sensed and controlled remotely over network(s), and the data generated by the devices may be collected, analyzed, or otherwise processed by computing devices and/or individuals. Individuals and/or computing systems may come to rely on the information provided by IoT devices to perform typical tasks and/or help manage their environment.

SUMMARY

Implementations of the present disclosure are generally directed to network management. More particularly, implementations of the present disclosure are directed to managing risk for a network of Internet-of-Things (IoT) devices according to a policy and/or a network model.

In general, innovative aspects of the subject matter described in this specification can be embodied in methods that include operations of: receiving a plurality of communications sent from a plurality of internet-of-things (IoT) devices on a network, each communication describing operations of a respective IoT device; determining, based on the plurality of communications, a model of an operational state for at least one of the plurality of IoT devices; detecting an operational deviation of the at least one IoT device compared to the model and, in response, determining a cost of the operational deviation of the at least one IoT device; and transmitting a signal to transfer value to an account that is associated with the IoT devices, the value being at least a portion of the cost of the operational deviation.

These and other implementations can each optionally include one or more of the following innovative features: the model is stored on a blockchain; the model describes a typical operational state of each of the plurality of IoT devices on the network; the blockchain further stores account information that identifies the account; transferring value to the account further comprises determining the account based on the account information stored on the blockchain; the blockchain further includes a smart contract that transfers the value to the account in response to detecting the operational deviation and determining the cost; the operations further include providing a policy indicating the cost of the operational deviation of the at least one IoT device and the value to be transferred in response to the operational deviation; the operations further include receiving an indication of at least one payment provided to maintain the policy; the operations further include detecting the presence of a new IoT device added to the network; the operations further include modifying the model based on the presence of the new IoT device on the network; the operations further include modifying the policy based on the presence of the new IoT device on the network; the policy is implemented by a smart contract that transfers the value to the account in response to detecting the operational deviation and determining the cost; at least one of the plurality of IoT devices is a telematics device that collects data regarding a vehicle; the value is a replacement cost to replace the at least one IoT device that exhibited the operational deviation; detecting the operational deviation further comprises determining that the operational deviation is exhibited by at least a threshold number or a threshold proportion of the plurality of IoT devices on the network; different ones of the plurality of IoT devices on the network support different communication protocols; and/or different ones of the plurality of IoT devices on the network output data in different formats.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and improvements over traditional systems. By providing a policy that at least partly compensates a user for damage caused by a failure or other operational deviation within a system of IoT devices, implementations provide a mechanism for mitigating the damage caused by such deviations and thus managing the risk involved in operating an IoT. Implementations also provide the ability for an IoT device, or a device that manages an IoT network, to detect the possibility of a failure of IoT device(s) in advance of such failure. This allows a policy to cover a lower cost to prevent a failure (e.g., by replacing a part) instead of covering a higher cost of to repair damage caused by a failure. Implementations also provide the ability for an IoT device to leverage a distributed network, such as a blockchain, to enable multiple entities to monitor, service, and maintain the IoT device. This allows a policy provider, such as an insurance company, to rely on such trusted entities as part of the policy program. In some implementations, a single policy framework enables protection of multiple IoT devices (e.g., smart home devices as well as a connected vehicle), and may also enable user interaction in a connected city environment. For example, a user policy may cover a user within a connected city framework of offices, schools, streets, commuting vehicle, entertainment venues, and so forth.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
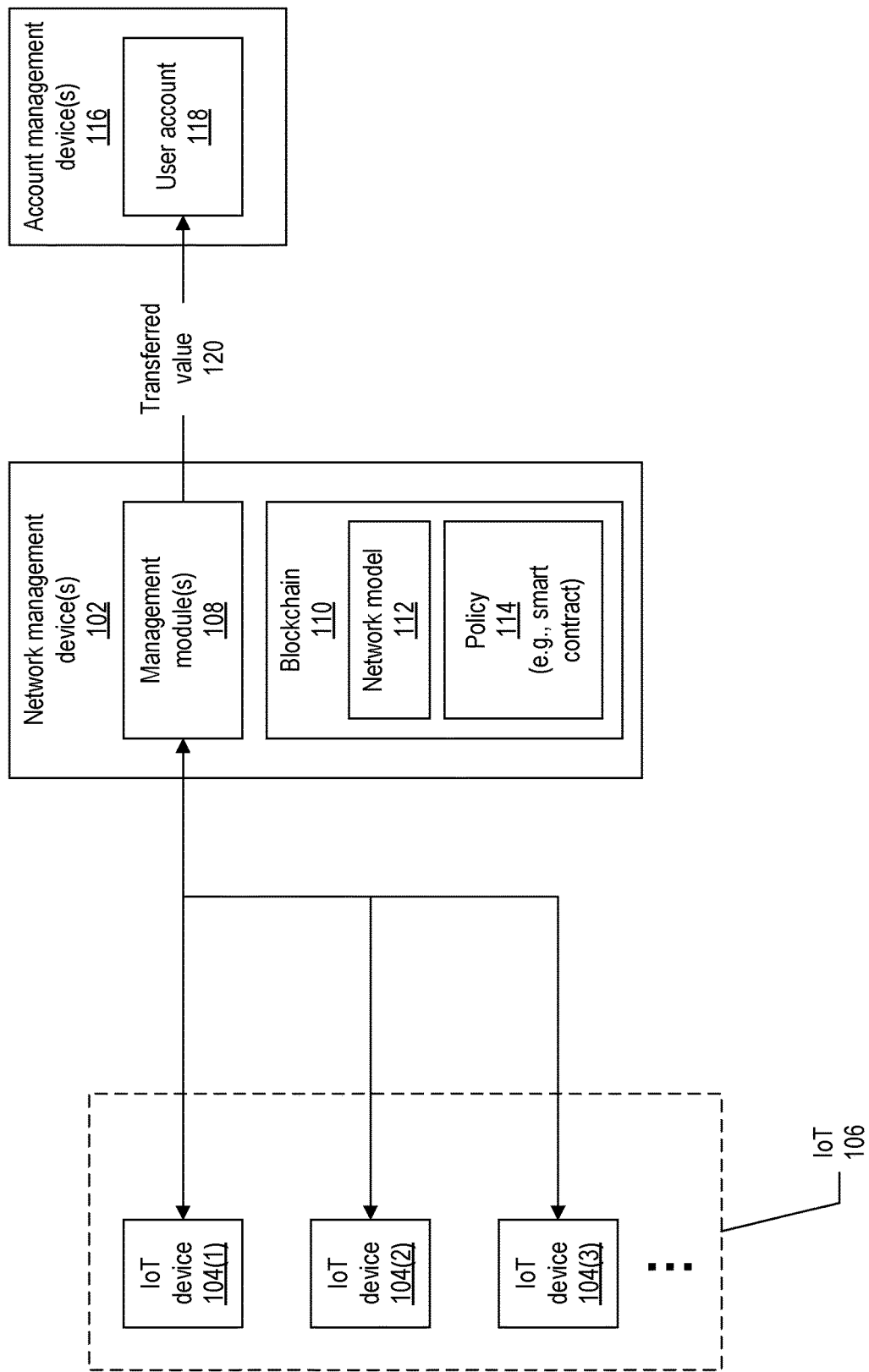
FIG. 1 depicts an example system for network management, according to implementations of the present disclosure.

Implementations of the present disclosure are directed to systems, devices, methods, and computer-readable media for managing risk in a network that includes one or more Internet-of-Things (IoT) devices. A network of IoT device(s) may be described as an IoT. An IoT device and an IoT may alternatively be described, respectively, as an Internet-of-Everything (IoE) device and an IoE. Management module(s) may operate to determine a model for an IoT in a home, office, or other environment. The model may describe typical operations of the device(s) that are connected over an IoT. For example, in instances where a smart lock is designed to keep a door locked until an appropriate code is entered on a keypad of the lock, the model for an IoT that includes the smart lock would describe this lock behavior has a normal operating state for the smart lock. As another example, in instances where a set of lighting fixture IoT devices are designed to be on or off according to a schedule that is specified by a user, the model for an IoT that includes the fixtures would describe this schedule-based lighting behavior as a normal operating state. Moreover, in some implementations the model may take into account the health of the IoT device where such data is available. The health of an IoT device may include a current operational status of the device (e.g., functioning, non-functioning, etc.), a current level of performance of the device, a maintenance state of the device (e.g., whether the device is due for maintenance, recently received maintenance, etc.), and/or other information.

After the model is initially determined and stored, the operations of the IoT devices may be monitored for compliance with the model. The management module(s) may detect instances when one or more IoT devices exhibit behaviors that are a deviation from the normal operations indicated in the model. The operational deviations may include complete failures, e.g., the IoT device(s) may stop functioning entirely. The operational deviations may also include situations where the IoT device(s) are still functioning, but in a manner that is outside their normal operating parameters, contrary to their design or specification, contrary to their programming, and/or otherwise atypical. For example, an operational deviation of the smart lock described above may include the lock stuck in a locked or unlocked state and unresponsive to appropriate code(s) entered through the keypad. As another example, an operational deviation of the lighting fixtures described above may include the fixtures failing to illuminate, failing to respond to commands to turn on, turn off, or change their brightness, or failing to behave according to a programmed schedule for illumination.

In some implementations, a policy may be specified for a user who is associated with the IoT, and the policy may indicate actions to be performed in response to detecting an operational deviation of one or more IoT devices. For example, the policy may indicate that a payment is to be made to transfer value into an account of the user in response to detecting an operational deviation of IoT device(s), in instances where the operational deviation causes some harm to the user (e.g., financial loss, physical harm, etc.). For example, a failure of a smart lock as described above may enable a burglar to enter the user's home and steal the user's possessions. In such examples, the policy may indicate that a payment be made to the user to compensate the user for the loss of property caused at least partly by the failure of the smart lock. In such examples, the policy may operate as an insurance policy that compensates the user for losses caused by operational deviation(s) of the IoT. As another example, a policy may provide for a future failure possibility, and may cover the cost of replacement of the device if the user takes action to replace the device (e.g., replace a lock) within a period of time following the prediction of failure. As another example, on detecting a complete failure of a light fixture (e.g., determining that the fixture is no longer connected to the IoT or otherwise inoperable), the policy may indicate that a payment be made to the user in an amount that enables replacement of the fixture (e.g., purchase of a new fixture). In such examples, the policy may operate as a warranty that compensates the user for failures or other operational deviations of the IoT devices, by replacing the device(s) or paying an amount sufficient to replace the device(s). In some examples, the policy itself may initiate a transaction to purchase a new fixture and have it shipped to the user. Accordingly, the transferred value may be monetary value transferred to the user's account, one or more purchased items, and/or some other form of value provided to the user.

In some implementations, the policy may be a smart contract that executes to automatically transfer value to the user in response to detecting an operational deviation on an IoT associated with the user. The smart contract may include logic to determine the amount of the value to be transferred under various circumstances, such as various types of operational deviations of the various IoT devices that are registered to the user. The smart contract may also keep track of payments made by the user (e.g., monthly premiums) to maintain the policy. In some implementations, the operational model for the IoT may be stored on a blockchain or other type of distributed ledger. The policy may also be stored on the blockchain. In instances where the policy is implemented as a smart contract, the smart contract may execute on the blockchain. In some implementations, the smart contract is also used by monitoring, maintenance, and other types of agencies to perform operations that ensure user safety and/or otherwise service the user.

Although IoT devices are commonly used in a connected home, connected office, or connected vehicle environment, there is a lack of standardization for communications protocols, data formats, and other operational aspects for IoT devices. Accordingly, different devices provided by different companies may be unable to communicate with one another, or may communicate data unreliably, leading to potential failures in which information is not communicated or is misinterpreted by a receiving device. Although a particular manufacturer may provide a warranty to compensate for failure of their own devices, such a manufacturer may not be responsible in instances where a failure occurs within an IoT that includes many different devices from different vendors. Implementations provide a policy that operates to mitigate the risk of financial loss, physical injury, and/or other types of harm that may result from failures or other types of operational deviation within an IoT.

The particular features of a policy may be based on the particular IoT devices that are in an IoT. For each device in an IoT, the policy may take into account the information that is received by the device, the data that is output by the device, the possible types of operational deviation that may be exhibited by the device, and/or the potential impact of the device's operational deviation on the user associated with the IoT and/or the operation of the IoT as a whole. The policy may take into account the assets that are owned by the user, and the potential impact on those assets that may be caused by an operational deviation of the IoT device(s).

In some examples, an IoT may include a telematics device that is communicatively coupled to a vehicle to receive information regarding the status and operations of the vehicle. Such information may include current location, speed, acceleration, direction of travel, orientation relative to one or more axes, fuel status, gas mileage, maintenance schedule, number of passengers, status of various components, and/or other information regarding the vehicle. The telematics device may be incorporated into the vehicle, e.g., by the manufacturer of the vehicle. In some instances, the telematics device may be an after-market device that is plugged into a data port of the vehicle by the user. If the telematics device malfunctions or is hacked by a malicious party, the telematics device may provide inaccurate information to a driver causing the driver to get into an accident, get lost, or experience some other type of harm. In some instances, if the telematics device is able to control the operation of the vehicle, a faulty or hacked telematics device may cause a malfunction of the vehicle. For example, the telematics device may cause an airbag to not deploy in an accident, or cause the airbag to deploy in the absence of an accident. As another example, the telematics device may fail to identify a roll-over situation and thus fail to notify emergency services of the accident. These and/or other types of harm may lead to compensation of a user who is associated with the policy, if the harm is caused by an operational deviation of an IoT device covered by the policy. In some implementations, this telematics scenario is extended to include vehicle provided information such as in connected cars, autonomous vehicles, advanced driver assistance systems (ADAS), and/or other driver assisting technologies which may be part of the IoT.

In some examples, a policy may apply to a fleet of vehicles operated by a delivery service, logistics company, ride sharing service, car-for-hire service, government agency, and/or other entity. Such an entity may be described as the user associated with the policy. IoT devices may operate within the fleet (e.g., as telematics devices) to track maintenance schedules, fuel consumption, locations, drive time, driver status, and/or other characteristics of the vehicles. In such instances, an operational deviation of one or more of the IoT devices in the fleet could lead to an increase in operating expenses, loss of sales, delays in deliveries or pickups, and/or other problems that may impact the entity financially. The policy may provide payments in response to IoT device failures that cause such losses, and thus mitigate the risk of financial impact caused by IoT operational deviations.

In some examples, as described above, an IoT may include smart locks, alarm systems, motion sensors, door/window sensors, and/or other security features of a home, office, vehicle, and/or other environment. An operational deviation of a lock or other security feature may enable theft, trespass, vandalism, assault, and/or other types of harm to the property and/or its occupants. As a particular example, a smart lock may be programmable by a user with a one-time access code, e.g., to enable a repair technician to access a home and repair an appliance. If the smart lock experiences an operational deviation that enables the code to be used to access the home more than once, the code may be used by an unscrupulous person to steal items from the home. The policy may provide a payment in response to such a harm that is caused by an operational deviation of the IoT device(s).

In some examples, an IoT may include various devices that provide utility services to home(s), office(s), and/or other types of facilities, such as water service, heating and air conditioning, gas service, sewage service, network access, and so forth. Such devices may include water heaters, heating and air conditioning units, network appliances, gas meters, various types of sensors, and so forth. The policy may mitigate the risk of financial loss caused by malfunctions or other operational deviations of the devices. For example, if a sensor fails to detect a water leak that would otherwise lead to a notification being sent, the water service being shut off, and/or other actions, the policy may at least partly cover the monetary loss caused by the water damage that would have been prevented had the sensor operated normally.

Implementations may also provide for risk mitigation in other types of settings such as industrial plants, hospitals, and so forth. In some instances, implementations may operate within a connected city to mitigate the losses that may be caused by IoT failures in the power distribution system, water distribution system, transportation system, traffic management system, emergency response system, and/or other systems that operate within a city or other area.

As described above, the value transferred based on the operation of the policy may compensate for the monetary loss and/or for replacement of faulty IoT device(s). The compensation may be for a financial loss, to cover medical expenses caused by physical harm, and so forth.

FIG. 1 depicts an example system for policy-based risk management for a IoT, according to implementations of the present disclosure. As shown in the example of FIG. 1, the system may include one or more network management devices 102. The network management device(s) 102 may include any suitable number and type of computing device(s), such as server computer(s). In some instances, the network management device(s) 102 may include distributed computing device(s), e.g., cloud server(s).

The system may include any number of IoT devices 104 that may communicate with the network management device(s) 102 over one or more wired or wireless networks. An IoT device may be any suitable device that includes capabilities for network communication and, in some instances, data sensing, data storage and/or processing. An IoT device may include network communications, data storage, sensing, and/or processing capabilities in addition to its other capabilities. For example, a smart water heater may operate as a conventional (not smart) water heater heating and distributing water to a water system in a house or other structure. In addition to its conventional water heating functionality, the smart water heater may also include: sensors to collect data regarding the operations of the water heater and the environment of the water heater; data storage to store the collected data; network transceiver(s) to send and/or receive information over network(s); and/or processor(s) that execute software to receive, analyze, and/or store the data, communicate the data to remote devices and/or services, and/or control the operations of the water heater. Such functionality may also be present in other types of IoT devices. In some instances, the network connectivity and processing capabilities of an IoT device may enable the device to be remotely sensed and/or controlled over one or more networks by remote processes and/or devices.

The IoT devices 104 may include, but are not limited to, one or more of the following: smart appliances (e.g., washers, dryers, refrigerators, ovens, dishwashers); home entertainment systems (e.g., televisions, audio systems, game consoles, media players, etc.); in-home control systems (e.g., garage door openers, alarm systems, smart locks, door and/or window control mechanisms, security systems, smart home systems, etc.); lighting devices (e.g., lamps, fixtures, etc.); utility systems that provide and/or control electric power, gas, water, sewage, heating and air conditioning, network access, and so forth, (e.g., water meters, water heaters, gas meters, electrical switch boxes, circuit breaker boxes, etc.); and/or portable or less portable computing devices (e.g., smartphones, tablet computers, electronic book readers, gaming systems, laptop computers, desktop computers, television set-top boxes, in-vehicle automotive computers or telematics devices, etc.). In some instances, the IoT devices 104 may be in the home or other building, and/or outside the building but in a same property lot as the building. In some instances, the IoT devices 104 may be external to the building and sufficiently proximal to the building such that the data 106 generated by the IoT device(s) 104 indicates a status of the building. For example, an IoT device 104 may be a power distribution device located on a utility box, switch box, or other location external to the building and its lot, but indicating a level of electrical power being consumed by and/or supplied to devices in the building or on the lot.

The IoT devices 104 may be connected to one another through an IoT 106. The IoT devices 104 may employ the IoT 106 to send data to one another, such as notifications, status information, sensor data, and so forth. The IoT 106 may include wired connections between devices, wireless connections between devices, or both wired and wireless connections. In some instances, the network management device(s) 102 may be connected to the IoT devices 104 over the IoT 106. Accordingly, the network management device(s) 102 may also be IoT device(s) 104.

The network management device(s) 102 may execute one or more management module(s) 108. The management module(s) 108 may receive communications (e.g., signals) from the various IoT devices 104, the communications carrying information describing the operations of the IoT devices 104. The received information conveyed in the communications is used to develop and/or update a network model 112. In some instances, the model 112 may be developed based on information that is received from other sources (other than the IoT device(s)), such as information (from device manufacturers, third party evaluators, and/or others) describing the expected, typical, and/or intended functioning of the IoT device(s). The network model 112 may describe the normal, typical, and/or non-aberrant operational status of the IoT devices 104 in the IoT 106. Accordingly, the network model 112 may indicate, for each of the IoT devices 104, a normal behavior of that device in various situations. In some instances, the network model 112 may indicate a range of possible normal behaviors of IoT device(s) 104 in the IoT 106. The management module(s) 108 may monitor the operations of the IoT device(s) 104 and detect instances when the operations of IoT device(s) 104 deviate from the normal operations described in the network model 112.

The network management device(s) 102 may store, or have access to, a policy 114 that indicates action(s) to be performed based on detected operational deviation(s) of IoT device(s) 104. In some instances, as described above, the action(s) may include a transfer of value 120 (e.g., monetary value) to a user account 118 that is associated with a user who is associated with the IoT 106. For example, a homeowner that has IoT device(s) 104 in their home may be compensated, according to the policy 114, in response to detected operational deviation(s) of the IoT device(s) 104. The user account 118 may be managed by one or more account management devices 116, which may include any suitable number and type of computing device. For example, the account management device(s) 116 may be operated by a bank or other financial institution that provides the user account 118, e.g., a bank account, for the user. The action(s) may also include the purchase of a new device to replace a failed IoT device 104, and/or the shipment of the replacement device to the user.

In some implementations, the network management device(s) 102 may operate as a blockchain node and may store, or have access to, a blockchain 110. The network model 112 and/or policy 114 may be on the blockchain 110. The blockchain 110 may provide security features for access control, encryption, and so forth, to ensure that the information stored on the blockchain is only accessible by authorized users and/or processes.

In some implementations, the policy 114 may be a smart contract that operates automatically to perform action(s) in response to a detected operational deviation of the IoT device(s) 104, such as transferring the value 120, purchasing replacement device(s), and/or performing other action(s). The device-to-device interactions between IoT device(s) 104 may be tracked on the blockchain 110 and/or reflected in the network model 112 that is stored on the blockchain 110. In some instances, a detected operational deviation of a single IoT device 104 may be sufficient to trigger an action to be performed according to the policy 114. In some instances, the policy 114 may indicate that action(s) are to be performed based on at least a threshold number and/or threshold proportion of IoT devices 104 in the IoT 106 exhibiting operational deviation(s). In some implementations, the management module(s) 108 may be omitted from the system, and the smart contract policy 114 may perform the various operations to develop and maintain the network model 112 and/or perform action(s) such as the transfer of value 120. The transfer of value 120 may include the management module(s) 108 and/or policy 114 sending a signal to request a funds transfer from one account into the user account 118.

In some implementations, the network model 112 and/or policy 114 are stored on a blockchain 110. A blockchain, which may also be referred to as a distributed ledger, is a public or private ledger of all transactions that have been executed in one or more contexts (e.g., negotiable instrument transactions, digital currency transactions, etc.). A blockchain may grow as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions (e.g., deposits, withdrawals, etc.) to validate a requested transaction, all entities must agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger or blockchain system can include one or more sidechains. A sidechain can be described as a blockchain that validates data from other blockchains. In some examples, a sidechain enables ledger assets (e.g., a digital currency) to be transferred between multiple blockchains.

Figure 2:
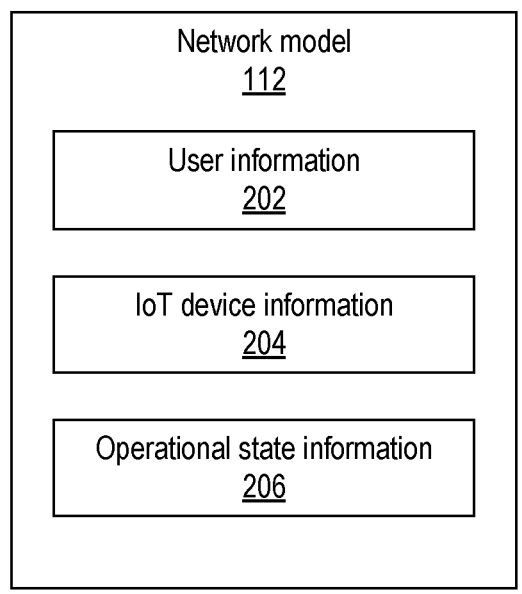
FIG. 2 depicts an example schematic of a network model employed in network management, according to implementations of the present disclosure.

FIG. 2 depicts an example schematic of a network model 112 employed in network management, according to implementations of the present disclosure. The network model 112 may be associated with a particular IoT 106 that includes a set of IoT devices 104. In some instances, the network model 112 may describe multiple IoTs 106.

The network model 112 may include user information 202 regarding user(s) associated with the IoT(s) 106. The user(s) may be individuals or may be corporate entities such as a business, government agency, non-profit organization, and so forth. For example, the user information 202 may include a name, address, email address, telephone number, and/or other contact information for the user(s). The user information 202 may also include an identifier of a policy 114 that is associated with the user(s). In some instances, the user information 202 may include information identifying the user account 118 associated with the user.

The network model 112 may include IoT device information 204, which describes the various IoT device(s) 104 on the IoT(s) 106 modeled by the network model 112. For example, the IoT device information 204 may include, for each of the IoT device(s) 104, one or more of the following: a name of the device, an identifier of the device, a network address of the device, a type of the device, a model or version number of the device, a manufacturer of the device, and/or information describing the communications protocols, sensor capabilities, and/or other capabilities of the device.

The network model 112 may include operational state information 206. As described above, the operational state information 206 may indicate a normal, typical, and/or non-aberrational operational state of the various IoT device(s) 104 described in the IoT device information 204.

Figure 3:
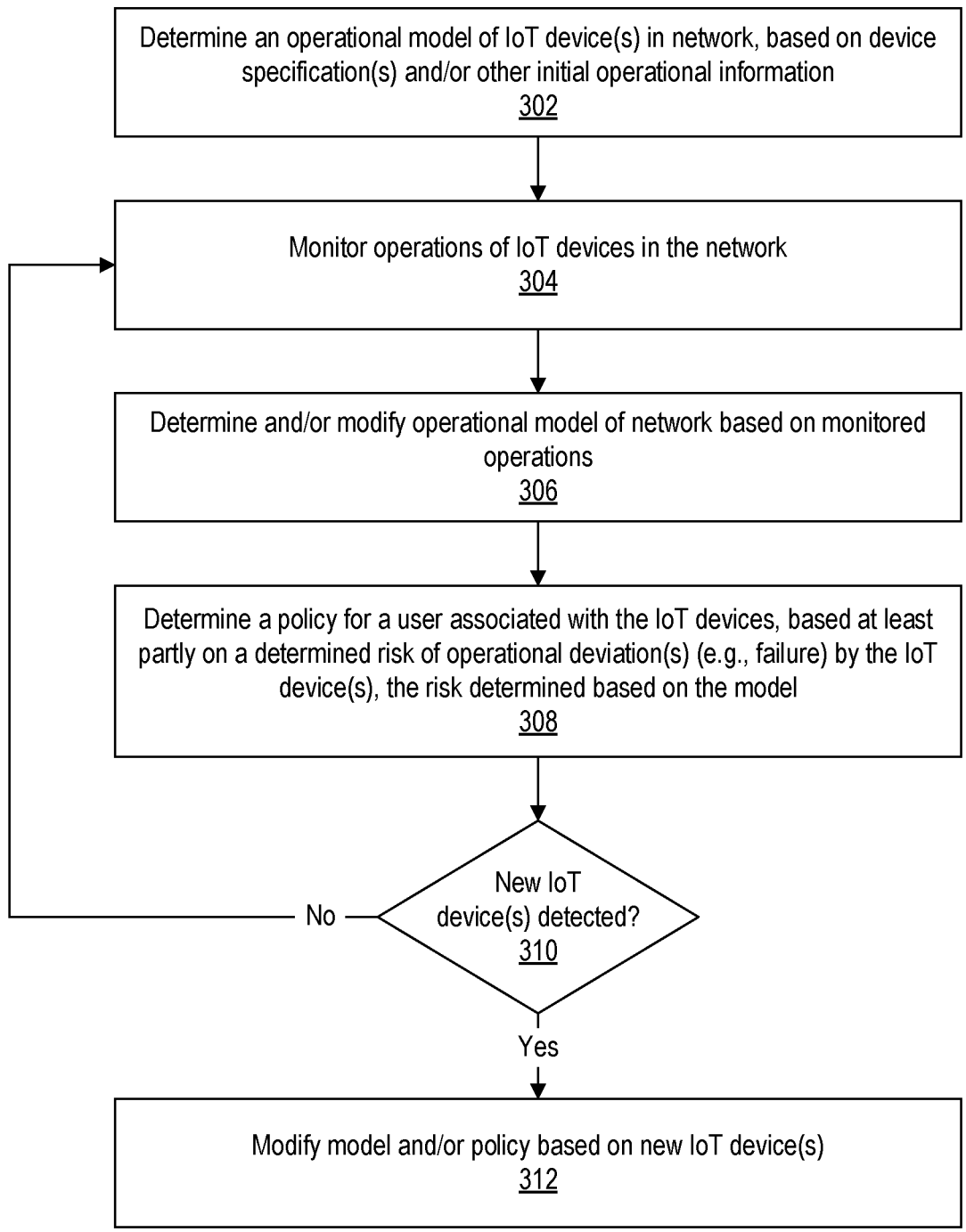
FIG. 3 depicts a flow diagram of an example process for an operational model of a network and a policy for a user, according to implementations of the present disclosure.

FIG. 3 depicts a flow diagram of an example process for an operational model of a network and a policy for a user, according to implementations of the present disclosure. Operations of the process may be performed by one or more of the management module(s) 108, the policy 114, and/or other software executing on the network management module(s) 102, the IoT device(s) 104, or elsewhere.

In some implementations, an initial version of the model 112 may be determined (302) for the IoT device(s) 104 in the IoT 106, based on device specification(s) and/or other initial operational information for the IoT device(s) 104. For example, such information may be provided by a manufacturer of the IoT device(s) 104, and may be used to provide the model 112 as an initial baseline model describing the expected operation of the IoT device(s) 104 as designed and manufactured.

The operations of the IoT device(s) 104 in the IoT 106 may be monitored (304). The operational model 112 may be determined (306) based on the monitored operations. In implementations where the initial model 112 is determined as described with reference to 302, the model 112 may be modified (e.g., refined) based on the observed operations of the IoT device(s) 104. In implementations where 302 is omitted, the model 112 may be both determined and subsequently modified based on the monitored operations of the IoT device(s) 104.

The policy 114 may be determined (308) for a user associated with the IoT device(s) 104, based at least partly on a determined risk of operational deviation(s) occurring in the IoT device 104. In some implementations, the risk of operational deviation(s) may be based at least partly on the model 112. For example, the model 112 may indicate normal operations of the IoT device(s) 104 as well as the various probabilities that the IoT device(s) 104 may exhibit various types of aberrant behavior. The model 112 and/or policy 114 may be stored on the blockchain 110 and used as described with reference to FIG. 4.

In some implementations, on detecting new IoT device(s) 104 that are added to the IoT 106 (310), the model 112 and/or policy 114 may be modified (312) based on the addition of the new IoT device(s) 104 to the IoT 106. As shown in the example of FIG. 3, the monitoring of the IoT device(s) 104 may be ongoing, and the model 112 may be further adjusted based on the monitored operations of the IoT device(s) 104.

The addition of new IoT device(s) 104 to the IoT 106 may include the device(s) 104 registering and/or authenticating themselves with the network management module(s) 108. Such registration may include providing information that the user is associated with the new device(s) 104, e.g., as an owner or operator of the device(s)104. The model 112 may be updated to include the new device(s) 104 in the IoT device information 204, and to include an expected behavior of the new device(s) 104 in the operational state information 206.

The policy 114 may be adjusted as well based on the new device(s) 104. For example, the addition of a new device 104 may increase the risk of an operational deviation occurring in the IoT 106, given that the new device 104 is an additional point of possible failure. In some instances, the additional of a new device 104 may decrease the risk of occurrence of an operational deviation, e.g., if the new device 104 provides redundancy, better security, failover support, or improved or more reliable functionality compared to current device(s) 104 in the IoT 106. The policy 114 may be adjusted based on the change in overall risk. For example, the payment(s) (e.g., premiums) to be paid by the user may be adjusted, the value 120 to be provided may be adjusted, and/or other terms of the policy 114 may be otherwise adjusted. For example, if the user adds new sensors, new security devices, more reliable locks or alarms, or other IoT device(s) 104 to their home network, the policy 114 may be altered automatically based on the reduced risk of loss.

In some implementations, artificial intelligence (AI) and/or machine learning techniques may be employed to build and refine the model 112 and/or policy 114 based on understanding patterns of failure within an IoT 106 and/or based on detected anomalies. AI and machine learning can be leveraged to understand the pattern of usage of each IoT device (or system of devices), perform (e.g., actuarial) analysis to determine the risk model, refine the policy, determine premiums and discounts, and/or for other purposes. Such learning may be leveraged across the population of users to create specific policies, such as policy models for colder climate vs. warmer regions, metro cities vs. rural areas, high catastrophe areas vs safer places, and so forth. Moreover, in some implementations anomaly detection may be performed when a deviation from a pattern occurs, thereby providing ability to prevent a possible catastrophe or failure and/or minimize policy claims. In some implementations, the management module(s) 108 may generate and send recommendations to the user regarding additional device(s) 104 that may be added to the IoT 106 to reduce the risk of loss.

Figure 4:
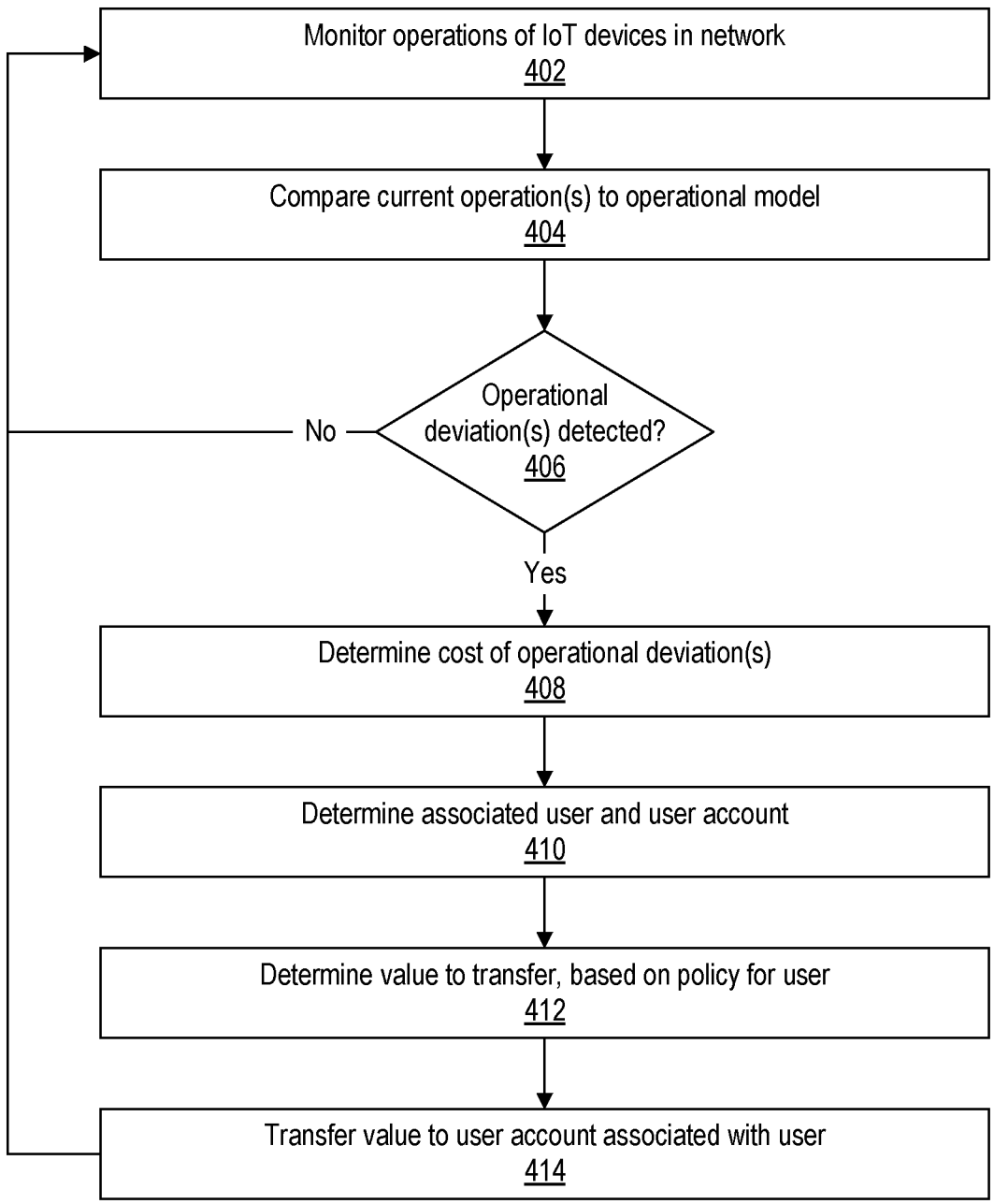
FIG. 4 depicts a flow diagram of an example process for applying a policy to manage risk in a network, according to implementations of the present disclosure.

FIG. 4 depicts a flow diagram of an example process for applying a policy to manage risk in a network, according to implementations of the present disclosure. Operations of the process may be performed by one or more of the management module(s) 108, the policy 114, and/or other software executing on the network management module(s) 102, the IoT device(s) 104, or elsewhere.

The operations of IoT device(s) 104 in a IoT 106 may be monitored (402), and the current monitored operations may be compared (404) to the operational model 112 that has been developed as described above. If no operational deviation(s) are detected (406), the monitoring may continue. Operational deviation(s) may be a difference between observed operations and the expected or normal operations described by the model 112. If operational deviation(s) are detected (406), various action(s) may be performed. In some implementations, the action(s) may be performed if the observed operations deviate from the normal operations beyond a predetermined threshold difference that is described in the policy 114.

In some implementations, in response to a detected operational deviation, a cost of the operational deviation may be determined (408). The cost may be the monetary value of the damage that is caused, at least in part, by the operational deviation. The cost may be the replacement cost of the device 104 that exhibited the operational deviation.

The user information 202 in the model 112 may be accessed to determine (410) the user and/or user account 116 that is associated with the IoT device 104 that exhibited the operational deviation, e.g., the registered user of the device 104. In some implementations, a value 120 may be determined (412) to be transferred to the user account 116 of the user, as described above. The value 120 may be determined based on the policy 114, and may be at least a portion of the cost of the operational deviation. The determined value 120 may be transferred (414) to the user account 116 associated with the user. The process may continue monitoring for subsequent operational deviations. Other action(s) may also be performed in response to detecting an operational deviation. For example, a notification may be sent to the user, the notification describing the particular deviation exhibited by the particular device 104. In some instances, the action(s) may include sending instructions to other device(s) 104 to perform operations that would otherwise be performed by the device 104 that exhibited the operational deviation.

In some implementations, the information received from multiple IoT devices 104, and/or the cessation of the receipt of information from multiple IoT devices 104, may lead to an inference of a broader and/or network-wide failure of devices on an IoT. For example, such a broad failure may be due to a catastrophe (e.g., natural or otherwise) that causes substantial damage throughout a house or other structure. The policy 114 may include provisions that govern the compensation due to the owner in the event of such a total loss, catastrophic loss, and/or substantial network-wide device failure.

As described above, a policy 114 may insure against the failure of IoT device(s) 104, and cover the cost to repair device(s) and/or replace device(s) with new and/or compatible device(s). The policy 114 may also cover other types of losses. For example, in instances where IoT device(s) 104 are able to request and/or initiate a transaction with a third party service, such as the automatic purchase of a replacement part and/or repair service, the policy may also insure against monetary losses that are due to an IoT device erroneously requesting or initiating such a transaction.

In some implementations, a learning model is employed to predict losses (e.g., monetary losses) that are caused by the failure of IoT device(s) 104, and the policy may be based on the output predictions of such a learning model. The model may be trained or otherwise developed using any suitable machine learning technique(s), including supervised and/or unsupervised learning techniques. In some instances, the model may also predict follow-on damages that are caused by the failure of an IoT device. For example, failure of an IoT device may cause failures in other device(s) that consume data from, or otherwise interact with, the failed IoT device. The other device failures, may cause failures of additional devices, and so on. Thus, a primary failure may lead to secondary failures, tertiary failures, and so forth, and each propagation of the failure may cause damages (e.g., monetary or otherwise). The model may predict damages caused by failure of an IoT device, as well as damages caused by the propagation of such a failure to other device(s) in an IoT.

In some instances, the management module(s) 108 may take preventive actions in response to the prediction of a failure in an IoT device, such as sending communications to cause the preemptive replacement and/or repair of device(s) that are predicted to fail, shutting down device(s) that are predicted to fail, instructing other device(s) to perform operations that would otherwise be performed by the device(s) that are predicted to fail, and so forth.

Figure 5:
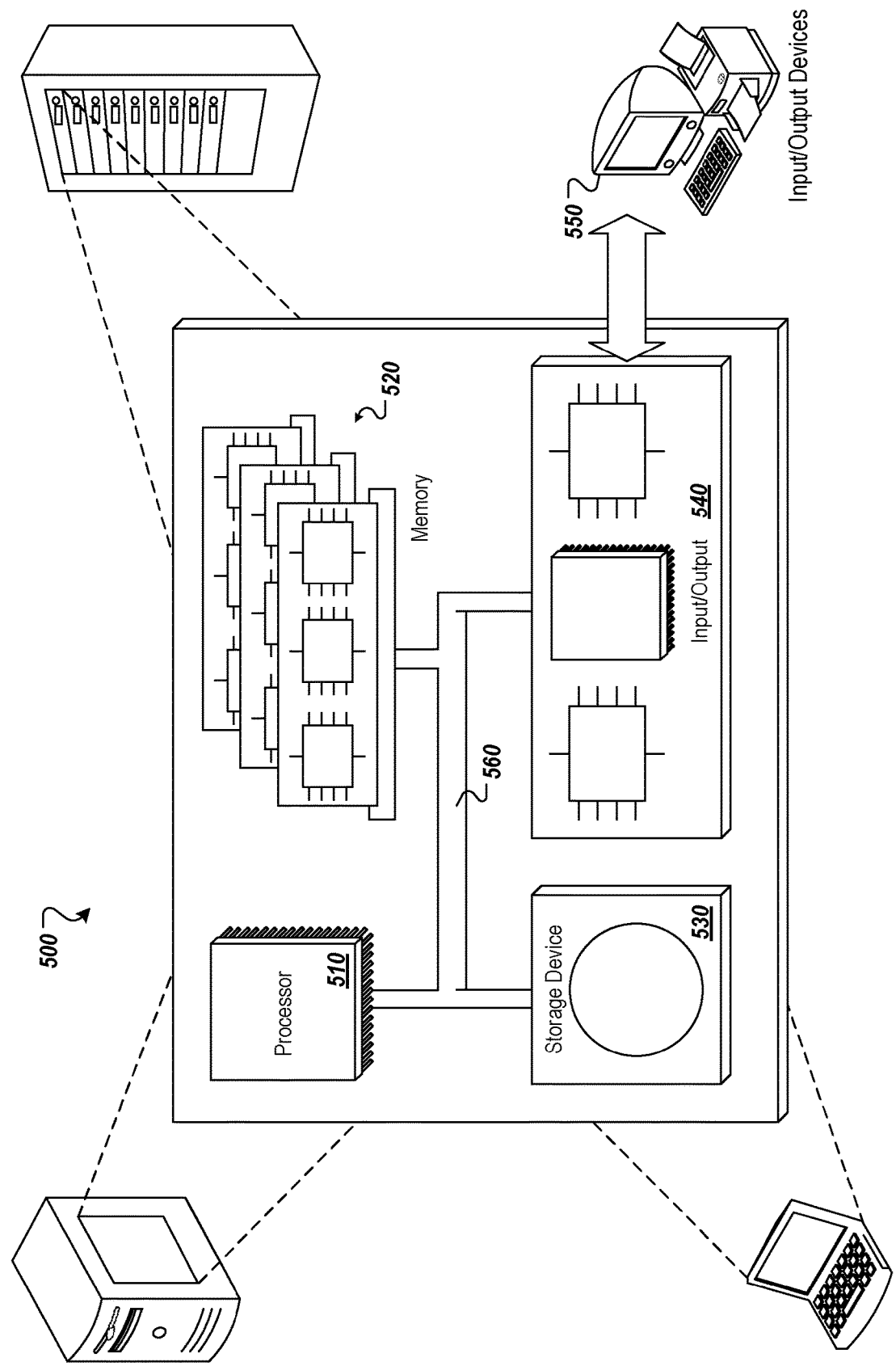
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the network management device(s) 102, the IoT device(s) 104, the account management device(s) 116, and/or other computing device(s) or system(s) described herein. The system 500 may include one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
  receiving, by the at least one processor, a plurality of communications sent from a plurality of internet-of-things (IoT) devices on a network, each communication describing operations of a respective IoT device;
  determining, by the at least one processor, based on the plurality of communications, a model of an operational state for at least one of the plurality of IoT devices;
  storing data specifying the model of the operational state for at least one IoT device and an account associated with the plurality of IoT devices on a distributed ledger;
  detecting, by the at least one processor, an operational deviation of the at least one IoT device compared to the model stored on the distributed ledger and, in response, determining a cost of the operational deviation of the at least one IoT device; and
  in response to detecting the operational deviation and determining the cost, executing, by the at least one processor, on the distributed ledger, a smart contract that transfers a value to the account stored on the distributed ledger and associated with the IoT devices, wherein the value is a replacement cost to replace the at least one IoT device that exhibited the operational deviation.

2. The method of claim 1, wherein:
  the distributed ledger is a blockchain;
  the model describes a typical operational state of each of the plurality of IoT devices on the network; and
  the blockchain further stores account information that identifies the account; and
  transferring the value to the account further comprises determining the account based on the account information stored on the blockchain.

3. The method of claim 1, further comprising:
  providing, by the at least one processor, a policy indicating the cost of the operational deviation of the at least one IoT device and the value to be transferred in response to the operational deviation.

4. The method of claim 3, further comprising:
receiving, by the at least one processor, an indication of at least one payment provided to maintain the policy.

5. The method of claim 3, further comprising:
detecting, by the at least one processor, the presence of a new IoT device added to the network;
modifying, by the at least one processor, the model based on the presence of the new IoT device on the network; and
modifying, by the at least one processor, the policy based on the presence of the new IoT device on the network.

6. The method of claim 3, wherein the policy is implemented by the smart contract that transfers the value to the account in response to detecting the operational deviation and determining the cost.

7. The method of claim 1, wherein at least one of the plurality of IoT devices is a telematics device that collects data regarding a vehicle.

8. The method of claim 1, wherein detecting the operational deviation further comprises determining that the operational deviation is exhibited by at least a threshold number or a threshold proportion of the plurality of IoT devices on the network.

9. The method of claim 1, wherein different ones of the plurality of IoT devices on the network support different communication protocols.

10. The method of claim 1, wherein different ones of the plurality of IoT devices on the network output data in different formats.

11. A system comprising:
at least one processor; and
a memory communicatively coupled to the at least one processor, the memory storing instructions which, when executed by the at least one processor, cause the at least one processor to perform operations comprising:
receiving a plurality of communications sent from a plurality of internet-of-things (IoT) devices on a network, each communication describing operations of a respective IoT device;
determining based on the plurality of communications, a model of an operational state for at least one of the plurality of IoT devices;
storing data specifying the model of the operational state for at least one IoT device and an account associated with the plurality of IoT devices on a distributed ledger;
detecting an operational deviation of the at least one IoT device compared to the model stored on the distributed ledger and, in response, determining a cost of the operational deviation of the at least one IoT device; and
in response to detecting the operational deviation and determining the cost, executing, by the at least one processor, on the distributed ledger, a smart contract that transfers a value to the account stored on the distributed ledger and associated with the IoT devices, wherein the value is a replacement cost to replace the at least one IoT device that exhibited the operational deviation.

12. The system of claim 11, wherein:
the distributed ledger is a blockchain;
the model describes a typical operational state of each of the plurality of IoT devices on the network;
the blockchain further stores account information that identifies the account; and
transferring value to the account further comprises determining the account based on the account information stored on the blockchain.

13. The system of claim 11, wherein the operations further comprise:
providing a policy indicating the cost of the operational deviation of the at least one IoT device and the value to be transferred in response to the operational deviation.

14. The system of claim 13, wherein the operations further comprise:
receiving an indication of at least one payment provided to maintain the policy.

15. The system of claim 13, wherein the operations further comprise:
detecting the presence of a new IoT device added to the network;
modifying the model based on the presence of the new IoT device on the network; and
modifying the policy based on the presence of the new IoT device on the network.

16. The system of claim 13, wherein the policy is implemented by the smart contract that transfers the value to the account in response to detecting the operational deviation and determining the cost.

17. One or more non-transitory computer-readable storage media storing instructions that, when executed by at least one processor, cause the at least one processor to perform operations comprising:
receiving a plurality of communications sent from a plurality of internet-of-things (IoT) devices on a network, each communication describing operations of a respective IoT device;
determining based on the plurality of communications, a model of an operational state for at least one of the plurality of IoT devices;
storing data specifying the model of the operational state for at least one IoT device and an account associated with the plurality of IoT devices on a distributed ledger;
detecting an operational deviation of the at least one IoT device compared to the model stored on the distributed ledger and, in response, determining a cost of the operational deviation of the at least one IoT device; and
in response to detecting the operational deviation and determining the cost, executing, by the at least one processor, on the distributed ledger, a smart contract that transfers a value to the account stored on the distributed ledger and associated with the IoT devices, wherein the value is a replacement cost to replace the at least one IoT device that exhibited the operational deviation.

* * * * *